United States Patent [19]

Bennick

[11] Patent Number: 5,722,734
[45] Date of Patent: Mar. 3, 1998

[54] RIM BRAKE DUST PROTECTING SYSTEM

[76] Inventor: Ted Bennick, Winchesster I, Oceanside, Calif. 92054

[21] Appl. No.: 723,390

[22] Filed: Sep. 30, 1996

[51] Int. Cl.⁶ ............................................. B60B 7/04
[52] U.S. Cl. .................... 301/37.1; 301/37.37; 301/37.42
[58] Field of Search ................................. 301/37.1, 37.23, 301/37.26, 37.35, 37.42, 37.37, 108.1, 108.2, 108.4; 188/218 A

[56] References Cited

U.S. PATENT DOCUMENTS

| | | | |
|---|---|---|---|
| 1,624,112 | 4/1927 | Murray | 301/108.4 X |
| 2,386,225 | 10/1945 | Lyon | 301/37.35 |
| 2,906,559 | 9/1959 | Lyon | 301/37.35 |
| 4,441,762 | 4/1984 | Segal | 301/37.42 X |
| 4,484,667 | 11/1984 | Bottieri, Jr. | 188/218 A |
| 4,606,582 | 8/1986 | Warren | 301/37.37 |
| 4,834,464 | 5/1989 | Frehse | 301/108.2 X |
| 5,031,965 | 7/1991 | Buerger | 301/37.37 |
| 5,511,857 | 4/1996 | Ichikawa et al. | 301/37.23 |

FOREIGN PATENT DOCUMENTS

| | | | |
|---|---|---|---|
| 204433 | 12/1986 | European Pat. Off. | 188/218 A |
| 4008333 | 9/1991 | Germany | 301/37.37 |
| 3173701 | 7/1988 | Japan | 301/37.1 |

*Primary Examiner*—Russell D. Stormer

[57] ABSTRACT

A new rim brake dust protecting system for providing a protective barrier between the exterior rim surface and the braking system thereby shielding brake dust from the exterior rim surface resulting in a clean uncorroded tire rim. The inventive device includes a round metal plate which is positioned mesial the tire rim and the wheel drum, and a formed arcuate rim secured to the round metal plate formed to the shape and size of the interior rim surface providing a barrier between the exterior rim surface and the braking system.

4 Claims, 3 Drawing Sheets

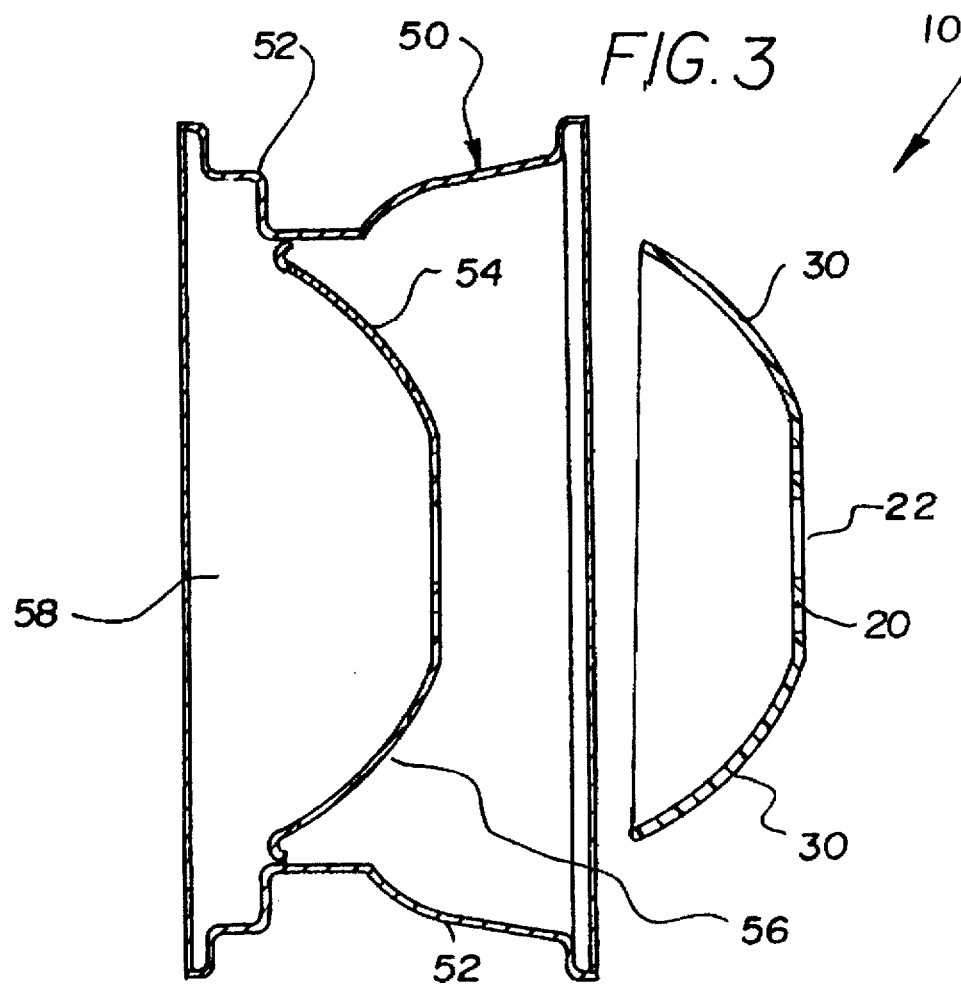
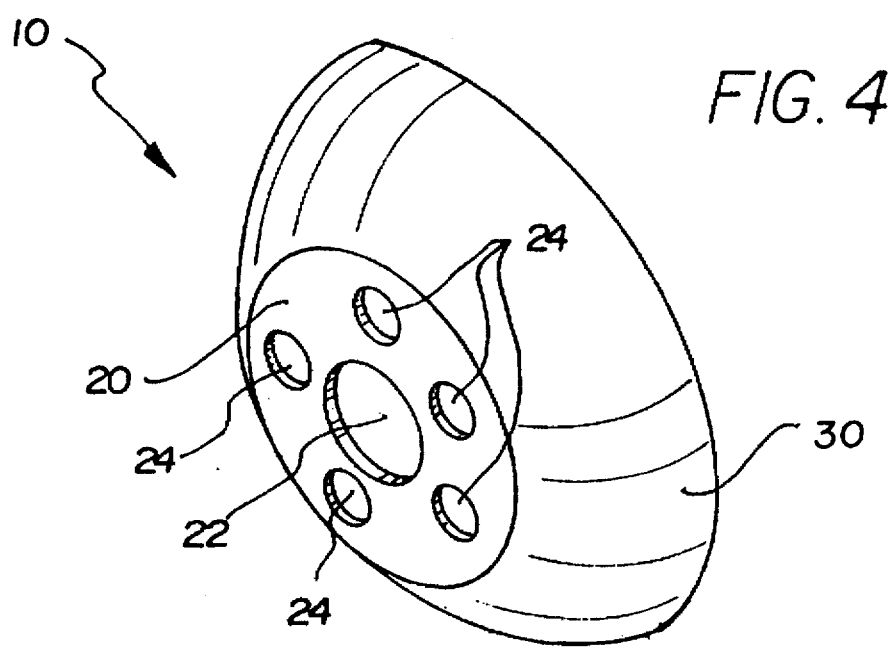

5,722,734

RIM BRAKE DUST PROTECTING SYSTEM

BACKGROUND OF THE INVENTION

1. Field of the Invention

The present invention relates to rim protecting devices and more particularly pertains to a new rim brake dust protecting system for providing a protective barrier between the exterior rim surface and the braking system thereby shielding brake dust from the exterior rim surface resulting in a clean uncorroded tire rim.

2. Description of the Prior Art

The use of rim protecting devices is known in the prior art. More specifically, rim protecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art rim protecting devices include U.S. Pat. No. 4,484,667; U.S. Pat. No. 5,039,172; U.S. Pat. No. 4,005,768; U.S. Pat. No. 4,540,069; U.S. Pat. No. 4,164,273 and U.S. Pat. No. 5,024,488.

While these devices fulfill their respective, particular objectives and requirements, the aforementioned patents do not disclose a new rim brake dust protecting system. The inventive device includes a round metal plate which is positioned mesial the tire rim and the wheel drum, and a formed arcuate rim secured to the round metal plate formed to the shape and size of the interior rim surface providing a barrier between the exterior rim surface and the braking system.

In these respects, the rim brake dust protecting system according to the present invention substantially departs from the conventional concepts and designs of the prior art, and in so doing provides an apparatus primarily developed for the purpose of providing a protective barrier between the exterior rim surface and the braking system thereby shielding brake dust from the exterior rim surface resulting in a clean uncorroded tire rim.

SUMMARY OF THE INVENTION

In view of the foregoing disadvantages inherent in the known types of rim protecting devices now present in the prior art, the present invention provides a new rim brake dust protecting system construction wherein the same can be utilized for providing a protective barrier between the exterior rim surface and the braking system thereby shielding brake dust from the exterior rim surface resulting in a clean uncorroded tire rim.

The general purpose of the present invention, which will be described subsequently in greater detail, is to provide a new rim brake dust protecting system apparatus and method which has many of the advantages of the rim protecting devices mentioned heretofore and many novel features that result in a new rim brake dust protecting system which is not anticipated, rendered obvious, suggested, or even implied by any of the prior art rim protecting devices, either alone or in any combination thereof.

To attain this, the present invention generally comprises a round metal plate which is positioned mesial the tire rim and the wheel drum, and a formed arcuate rim secured to the round metal plate formed to the shape and size of the interior rim surface providing a barrier between the exterior rim surface and the braking system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

Still another object of the present invention is to provide a new rim brake dust protecting system for providing a protective barrier between the exterior rim surface and the braking system thereby shielding brake dust from the exterior rim surface resulting in a clean uncorroded tire rim.

Yet another object of the present invention is to provide a new rim brake dust protecting system which includes a round metal plate which is positioned mesial the tire rim and the wheel drum, and a formed arcuate rim secured to the round metal plate formed to the shape and size of the interior rim surface providing a barrier between the exterior rim surface and the braking system.

Still yet another object of the present invention is to provide a new rim brake dust protecting system that retains the cleanliness of the exterior rim surface for extended periods of time.

Even still another object of the present invention is to provide a new rim brake dust protecting system that prevents brake dust from depositing on the exterior rim surface thereafter corroding the exterior rim surface.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2 disclosing the exterior and interior rim surfaces where the present invention is formed to engage the interior rim surface.

FIG. 4 is a rear perspective view of the invention.

DESCRIPTION OF THE PREFERRED EMBODIMENT

Figure 1:
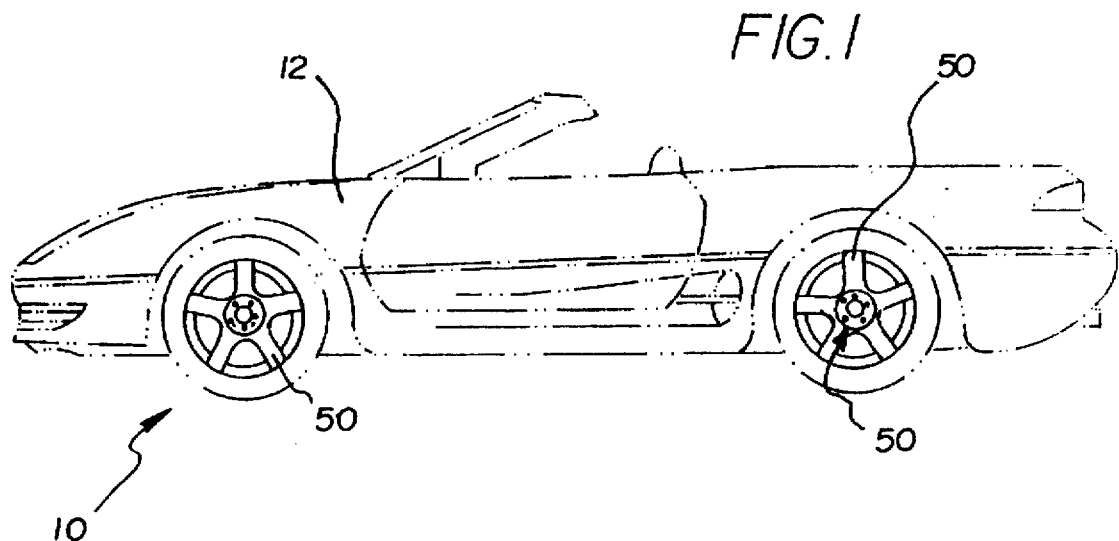
FIG. 1 is a side view of a new rim brake dust protecting system secured to two tire rims on a vehicle according to the present invention.
Figure 2:
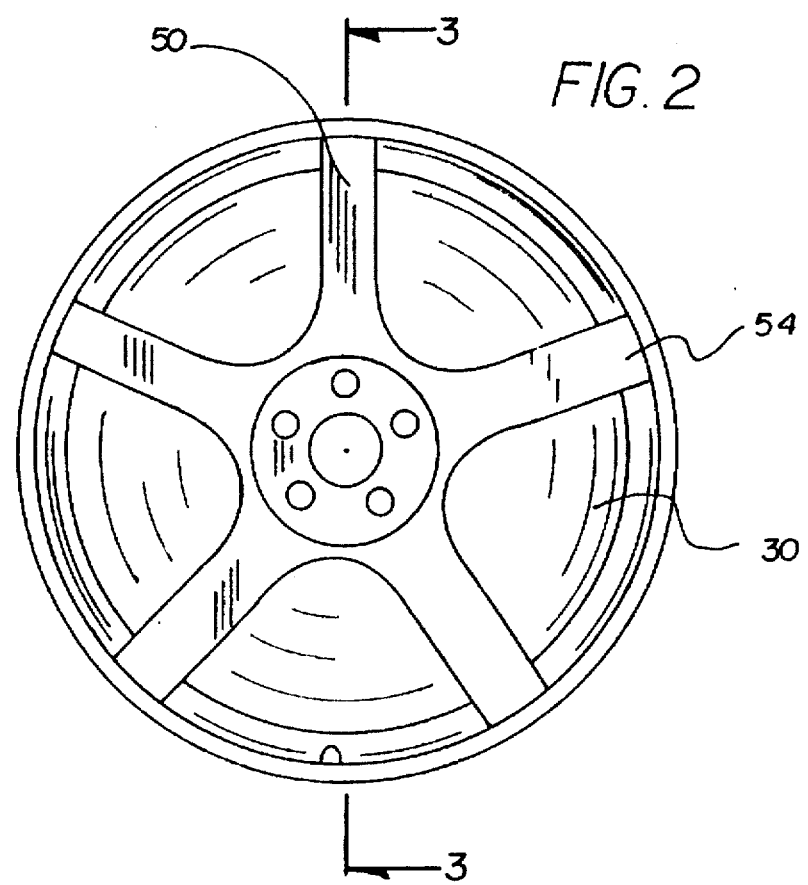
FIG. 2 is a magnified view of the present invention secured to the interior rim surface of the tire rim.

With reference now to the drawings, and in particular to FIGS. 1 through 6 thereof, a new rim brake dust protecting system embodying the principles and concepts of the present invention and generally designated by the reference numeral 10 will be described.

More specifically, it will be noted that the rim brake dust protecting system 10 comprises a round metal plate 20 formed to the shape of the central interior planar portion of a tire rim 50, and a formed arcuate rim 30 secured around the round metal plate 20 and formed to the shape and size of the interior rim surface 56 of the semi-spherical support member 54 and where the edge of the formed arcuate rim 30 is juxtaposed to the formed tire engaging rim 52.

Figure 5:
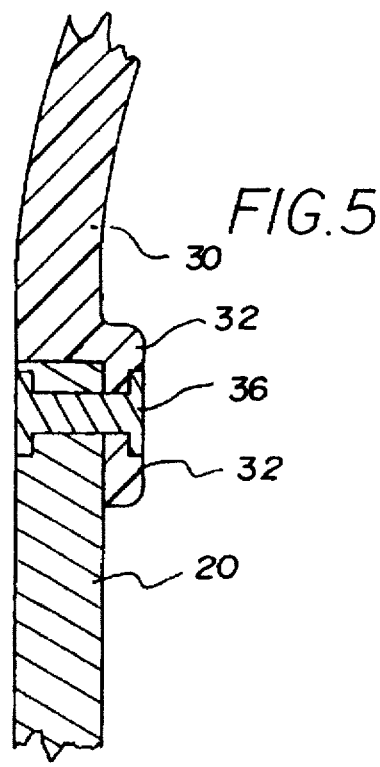
FIG. 5 discloses the L-shaped edge coupler engaging the round metal plate.
Figure 6:
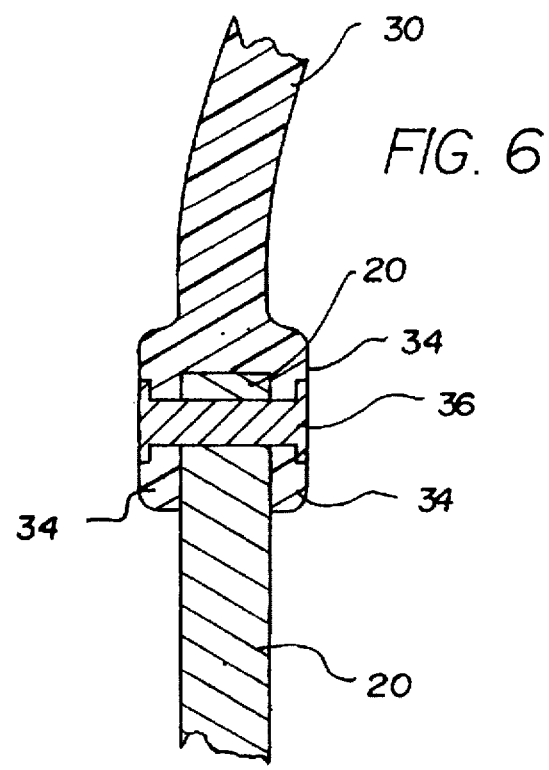
FIG. 6 is another embodiment of the present invention showing a U-shaped edge coupler engaging the round metal plate.

As best illustrated in FIGS. 1 through 6, it can be shown that the round metal plate 20 includes a bearing aperture 22 centrally positioned allowing the bearing of the vehicle 12 to project through, and includes a plurality of lug bolt aperture surrounding the bearing aperture 22 spaced to fit the corresponding apertures of the tire rim 50 thereby receiving the lug bolts from the brake drum. The round metal plate 20 is positioned mesial the interior rim surface 56 and the brake drum. The formed arcuate rim 30 is substantially conical shaped where the interior portion conforms to the interior rim surface 56 as best shown in FIG. 3 of the drawings. The formed arcuate rim 30 includes an L-shaped edge coupler 32 connecting to the exterior edge of the round metal plate 20 where a plurality of I-shaped fasteners 36 secure the formed arcuate rim 30 to the round metal plate 20 as shown in FIG. 5 of the drawings. As shown in FIG. 6 of the drawings, another embodiment of the present invention is the formed arcuate rim 30 including a U-shaped edge coupler 34 connecting to the exterior edge of the round metal plate 20 where a plurality of I-shaped fasteners 36 secure the formed arcuate rim 30 to the round metal plate 20.

In use, the user places the present invention over the interior rim surface 56 aligning the lug bolt apertures 24 with the tire rim 50. The user then positions the tire rim 50 and the present invention over the unnumbered lug bolts and secures them to the unnumbered brake drum with unnumbered lug nuts. The formed arcuate rim's 30 edge is juxtaposed to the formed tire engaging rim 52 sealing the brake dust from the unnumbered braking system from an exterior rim surface 58. This results in a cleaner exterior rim surface 58 and prevents corrosion of the exterior rim surface 58 thereby extending the useful life of the tire rim 50 and reducing the amount of cleaning time required to clean the tire rim 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rim brake dust protecting system for use with a vehicle tire rim having a substantially planar central interior portion and a semi-spherical support member surrounding said central interior portion, the semi-spherical support member of said tire rim having a convex interior surface for facing the hub of vehicle axle, said vehicle axle hub having a central wheel bearing housing and a number of lugs arranged in a circle pattern about said central bearing housing, said system comprising:

a central member comprising a round metal plate having a peripheral edge and being adapted to be mounted between the central interior portion of a tire rim and a vehicle axle hub; and a concave arcuate rim member secured around the peripheral edge of the round metal plate of said central member, said arcuate rim member portion being adapted to fit adjacent to the convex interior rim surface of the semi-spherical support member wherein said central member and said arcuate rim member comprise separate pieces secured together, said central member including a peripheral lip along the peripheral edge thereof overlapping a portion of said arcuate rim member, said central member being secured to said arcuate rim member by a plurality of fasteners passing through the peripheral lip of said central member and said arcuate rim member.

2. The rim brake dust protecting system of claim 1, wherein said central member includes a bearing aperture centrally positioned therein for allowing the bearing of the vehicle to project through the central member, and includes a plurality of lug bolt apertures surrounding the bearing aperture and arranged to align with the corresponding apertures of the tire rim for receiving the lug bolts from the axle hub.

3. A rim brake dust protecting system for use with a vehicle tire rim having a substantially planar central interior portion and a semi-spherical support member surronding said central interior portion, the semi-spherical support member of said tire rim having a convex interior surface for facing the hub of vehicle axle, said vehicle axle hub having a central wheel bearing housing and a number of lugs arranged in a circle pattern about said central bearing housing, said system comprising:

a round metal plate portion formed to the shape of an central interior planar portion of a tire rim, said metal plate portion having a peripheral edge;

a formed arcuate rim portion secured around the round metal plate portion and formed to the shape and size of the interior rim surface of a semi-spherical support member of a tire rim, said formed arcuate rim portion being for positioning next to the tire rim;

said round metal plate portion including a bearing aperture centrally positioned for allowing a bearing housing of the vehicle axle hub to project through said round metal plate portion, said round metal plate including a plurality of lug apertures surrounding the bearing aperture and arranged for receiving the lugs of a vehicle axle hub;

wherein the round metal plate is mesial the interior rim surface of said tire rim and the vehicle axle hub;

wherein the formed arcuate rim is substantially conical shaped with an interior portion conforming to the interior rim surface of said tire rim; and wherein the formed arcuate rim includes an L-shaped edge coupler connecting to the exterior peripheral edge of the round metal plate and including a plurality of I-shaped fasteners securing the formed arcuate rim to the round metal plate.

4. A rim brake dust protecting system for use with a vehicle tire rim having a substantially planar central interior portion and a semi-spherical support member surronding said central interior portion, the semi-spherical support member of said tire rim having a convex interior surface for facing the hub of vehicle axle, said vehicle axle hub having a central wheel bearing housing and a number of lugs arranged in a circle pattern about said central bearing housing, said system comprising:

a round metal plate portion formed to the shape of an central interior planar portion of a tire rim, said metal plate portion having a peripheral edge;

a formed arcuate rim portion secured around the round metal plate portion and formed to the shape and size of the interior rim surface of a semi-spherical support member of a tire rim, said formed arcuate rim portion being for positioning next to the tire rim;

said round metal plate portion including a bearing aperture centrally positioned for allowing a bearing housing of the vehicle axle hub to project through said round metal plate portion, said round metal plate including a plurality of lug apertures surrounding the bearing aperture and arranged for receiving the lugs of a vehicle axle hub;

wherein the round metal plate is mesial the interior rim surface of said tire rim and the vehicle axle hub;

wherein the formed arcuate rim is substantially conical shaped with an interior portion conforming to the interior rim surface of said tire rim; and wherein the formed arcuate rim includes a U-shaped edge coupler connecting to the peripheral exterior edge of the round metal plate securing the formed arcuate rim portion to the round metal plate portion.

* * * * *